(12) United States Patent
More et al.

(10) Patent No.: US 8,007,221 B1
(45) Date of Patent: Aug. 30, 2011

(54) LIFTING APPARATUS FOR REMOTE CONTROLLED ROBOTIC DEVICE

(75) Inventors: Grinnell More, Temple, NH (US); Tyson Sawyer, Rindge, NH (US)

(73) Assignee: iRobot Corporation, Bedford, MA (US)

( * ) Notice: Subject to any disclaimer, the term of this patent is extended or adjusted under 35 U.S.C. 154(b) by 429 days.

(21) Appl. No.: 11/255,586

(22) Filed: Oct. 21, 2005

Related U.S. Application Data

(60) Provisional application No. 60/621,509, filed on Oct. 22, 2004.

(51) Int. Cl.
*B25J 5/00* (2006.01)

(52) U.S. Cl. ....... 414/680; 180/9.32; 414/729; 414/815; 901/1

(58) Field of Classification Search .................. 414/680, 414/729, 724, 815; 180/9.32; 901/1
See application file for complete search history.

(56) References Cited

U.S. PATENT DOCUMENTS

| | | | |
|---|---|---|---|
| 3,465,904 A * | 9/1969 | Pensa | 414/694 |
| 4,932,831 A * | 6/1990 | White et al. | 414/732 |
| 5,413,454 A * | 5/1995 | Movsesian | 414/729 |
| 5,451,135 A * | 9/1995 | Schempf et al. | 414/694 |
| 5,664,348 A * | 9/1997 | Omann | 37/405 |
| 6,132,163 A * | 10/2000 | Andrews et al. | 414/685 |
| 6,263,989 B1 | 7/2001 | Won | |
| 6,336,786 B1 * | 1/2002 | Domann | 414/729 |
| 2002/0044862 A1 * | 4/2002 | Burton | 414/724 |
| 2003/0183428 A1 * | 10/2003 | Hedeen | 180/9.32 |

* cited by examiner

*Primary Examiner* — Donald Underwood
(74) *Attorney, Agent, or Firm* — Fish & Richardson P.C.

(57) ABSTRACT

A retrofittable lifting apparatus for use on an articulated robotically controlled device is disclosed. The lifting apparatus includes a structure for mating the apparatus to the robotic device and a mechanism for the remotely controlled lifting of an ordnance or other object. Actuation of the lifting mechanism may be provided by existing sources of motion on the robotic device, or by additional sources of motion attached to the robotic device.

30 Claims, 12 Drawing Sheets

LIFTING APPARATUS FOR REMOTE CONTROLLED ROBOTIC DEVICE

CROSS-REFERENCE TO RELATED APPLICATIONS

This application claims priority to and the benefit of U.S. provisional patent application Ser. No. 60/621,509, filed Oct. 22, 2004, the disclosure of which is being incorporated herein by reference in its entirety.

FIELD OF THE INVENTION

The present invention relates generally to the field of robotically controlled mobility platforms with articulated components and, more particularly, to a retrofittable lifting apparatus for use on a robotic device for handling ordnance and other heavy objects.

BACKGROUND OF THE INVENTION

Mobile robotic devices are useful in a variety of civilian, military, and law enforcement applications. For instance, a robotically controlled mobility platform can inspect or search buildings with structural damage caused by earthquakes, floods, or hurricanes, or can inspect buildings or outdoor sites contaminated with radiation, biological agents such as viruses or bacteria, or chemical spills. The platform can carry appropriate sensor systems for its inspection or search tasks. Military and law enforcement applications include operations that are deemed too dangerous for soldiers or law enforcement officers. For instance, the robot can be used to leverage the effectiveness of a human "pointman," and may also be used for reconnaissance, surveillance, bomb disposal and security patrols.

The use of robotic devices for bomb, artillery shell, and mine disposal purposes is of particular importance in military and law enforcement fields, where the use of a robotic device in an area seeded with mines or improvised explosive devices (IEDs) can greatly reduce the danger to human life. In these applications, a robotic device, controlled by an operator located a safe distance from the danger, or programmed to function autonomously, can be used to search for and disarm explosive devices that would otherwise require a human to locate and disarm manually.

One particular function of these robotic devices is to safely lift and transport explosive devices, such as the artillery shells often used in IEDs, to either remove them from a dangerous location or disarm them safely. These IEDs can be located above ground or imbedded within the ground, and can use a number of explosive devices. One such explosive device often used in IEDs is a 155 mm artillery shell, the weight of which may be about 96 lbs.

The existing state of the art requires large and heavy robots in order to lift and carry explosives such as mortar, artillery, and tank shells. Typically, the robot will need to be at least three to four times the weight of the ordnance it can lift and carry, according to conventional methods. These large and heavy robots may be limited in operational effectiveness, by, for example, being unable to enter small spaces, or travel over fragile or structurally damaged surfaces and floors. Large and heavy robots are also more difficult to transport and deploy, limiting the locations and situations in which such robotic devices can be utilized.

Smaller robotic devices are available for use in military and law enforcement applications, but have difficulty lifting and transporting larger and heavier objects, while still maintaining full operational functionality. One such robotic device is disclosed in U.S. Pat. No. 6,263,989, the disclosure of which is incorporated herein by reference in its entirety. A commercially available version of the robotic device described in the patent is available from iRobot Corporation, Burlington, Mass. under the trade name PackBot® robot.

From the foregoing, there is a need for a method and apparatus to allow smaller and lighter robotic devices, such as the PackBot® robot, to lift and transport ordnance that actually weigh significantly more than the robot itself. The addition of an apparatus for lifting and transporting heavy ordnance to lighter robotic devices will greatly increase the operational range and flexibility of robots in bomb disposal and other associated missions, allowing for the safe disposal of IEDs and other explosive devices in a wider variety of locations and conditions, and thus greatly reducing the risk to human life.

SUMMARY OF THE INVENTION

The invention relates to a lifting apparatus that can be configured with or retrofitted to any of a variety of robotic devices, including an articulated tracked robotic device of the type described in U.S. Pat. No. 6,263,989. The lifting apparatus can be an add-on mechanism which gives an articulated robot the ability to lift, carry, and release common battlefield ordnance such as artillery, mortar, and tank shells, or any other object of comparable size, shape or weight.

In one embodiment of the invention, the lifting apparatus can include two or more special purpose effectors, or lifting tines, that can be articulated around an axis of a robotic device, such that significant mechanical advantage may be applied to an object to be lifted. Articulation of the lifting tines can be accomplished by harnessing the motion of an existing component of the robotic device, such as elongated arms, or by the addition of a separate actuator to the robotic device. The mechanism, whereby the lifting tines are actuated by the existing source of motion, or added source of motion, may provide increased mechanical advantage to the articulating motion of the lifting tines.

In one embodiment of the invention, a pivoting apparatus is provided for mounting on an articulated tracked vehicle having a main tracked chassis and a pivoting elongated arm. The apparatus can include at least one pivoting member and at least one linkage arm for connecting the pivoting member to the elongated arm when installed. A proximal end of the at least one linkage arm can pivotably connect to a portion of the elongated arm remote from an axis of rotation of the elongated arm when installed. A distal end of the at least one linkage arm can pivotably connect to the at least one pivoting member remote from an axis of rotation of the pivoting member. The pivoting member can be pivotably connected to a portion of the main tracked chassis remote from the elongated arm.

The invention can further include a transversely disposed support arm attached to the at least one pivoting member. This support arm can connect to a portion of the at least one pivoting member remote from a connection point of the at least one linkage arm. The at least one linkage arm, the at least one pivoting member, and the support arm can be adapted to be releasably connectable to at least one of the articulated tracked vehicle and each other. The extension can be releasably attached to the support arm. The apparatus can be releasably mounted to the articulated tracked vehicle. At least one of the pivoting member and linkage arm can include a slotted pivotable connector.

One embodiment of the invention can include at least one extension for attachment to the support arm. This extension can be selected from the group consisting of a tine, a wirecutter, a hammer, a trowel, a shovel, a rake, a hook, a gripping mechanism, a reel, a camera, a metal detector, an x-ray source, a light source, a knife, a probe, a sensor, a weapon, a release mechanism, and a launcher. The support arm can provide multiple locations for attachment of the at least one extension.

One embodiment of the invention can provide an articulated tracked vehicle that includes a main chassis including a main frame having two sides and a front end, and including a pair of parallel main tracks, each including a flexible continuous belt coupled to a corresponding side of the main frame, a forward section including an elongated arm having a proximal end and a distal end, the proximal end of the arm being pivotally coupled to the main chassis near the forward end of the main chassis about a transverse axis generally perpendicular to the sides of the main chassis, and a pivoting apparatus driven by the elongated arm. The pivoting apparatus can include at least one pivoting member and at least one linkage arm for connecting the pivoting member to the elongated arm when installed.

In one embodiment, a rotation of the pivoting elongated arm of the articulated tracked vehicle can result in the at least one pivoting member pivoting about the rear end of the main tracked chassis. The elongated arm can have a length to allow the forward section to extend below the main section in at least some degrees of rotation of the arm, and a length shorter than the length of the main section. A complete revolution of the elongated arm can provide an oscillation of the at least one pivoting member of up to about 90 degrees. Alternatively, a complete revolution of the elongated arm can provide an oscillation of the at least one pivoting member of up to about 70 degrees. In a further alternative embodiment, a complete revolution of the elongated arm can provide an oscillation of the at least one pivoting member of up to about 50 degrees or less.

In one embodiment of the invention, the at least one pivoting member can have a minimum angle of at least about −15 degrees or more. Alternatively, the at least one pivoting member can have a minimum angle of at least about −10 degrees. In a further alternative embodiment, the at least one pivoting member can have a minimum angle of at least about −5 degrees. In one embodiment, the articulated tracked vehicle can also include a robotic arm, that can cooperate with the pivoting apparatus.

One embodiment of the invention can provide a method for providing a pivoting apparatus for mounting on an articulated tracked vehicle having a main tracked chassis and a pivoting elongated arm. The method can include the steps of connecting at least one pivoting member to the tracked chassis and connecting at least one linkage arm between the pivoting member and the elongated arm. The method can further include the step of connecting a transversely disposed support arm to the at least one pivoting member. A rotation of the pivoting elongated arm of the articulated tracked vehicle can result in the at least one pivoting member pivoting about the rear end of the main tracked chassis. The pivoting apparatus is adapted to lift and support an object. The articulated tracked vehicle can further include a robotic manipulator arm. The robotic manipulator arm is adapted to assist the pivoting apparatus in lifting and supporting the object.

One embodiment of the invention can provide a method for picking up and transporting an object with an articulated tracked vehicle and mounted pivoting apparatus. This can include a method for approaching an object, rapidly approaching an object to facilitate lifting, and/or picking up an object on hard or soft surfaces. This can further include a method for utilizing another element to assist in guiding an object onto the lifting apparatus and/or stabilizing or supporting an object on the lifting apparatus. Elements that can be used to assist in guiding, lifting, and supporting an object include an environmental feature, a separate device, or a further device attached to the articulated tracked vehicle. One device for assisting in guiding, lifting, and supporting an object can be a robotic manipulator arm attached to the articulated tracked vehicle.

These and other objects, along with advantages and features of the present invention herein disclosed, will become apparent through reference to the following description and the accompanying drawings and photos. Furthermore, it is to be understood that the features of the various embodiments described herein are not mutually exclusive and can exist in various combinations and permutations.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

The invention provides methods and apparatus related to a retrofittable lifting apparatus for an articulated tracked vehicle such as, but not limited to, a remote controlled mobile robotic device.

Figure 1:
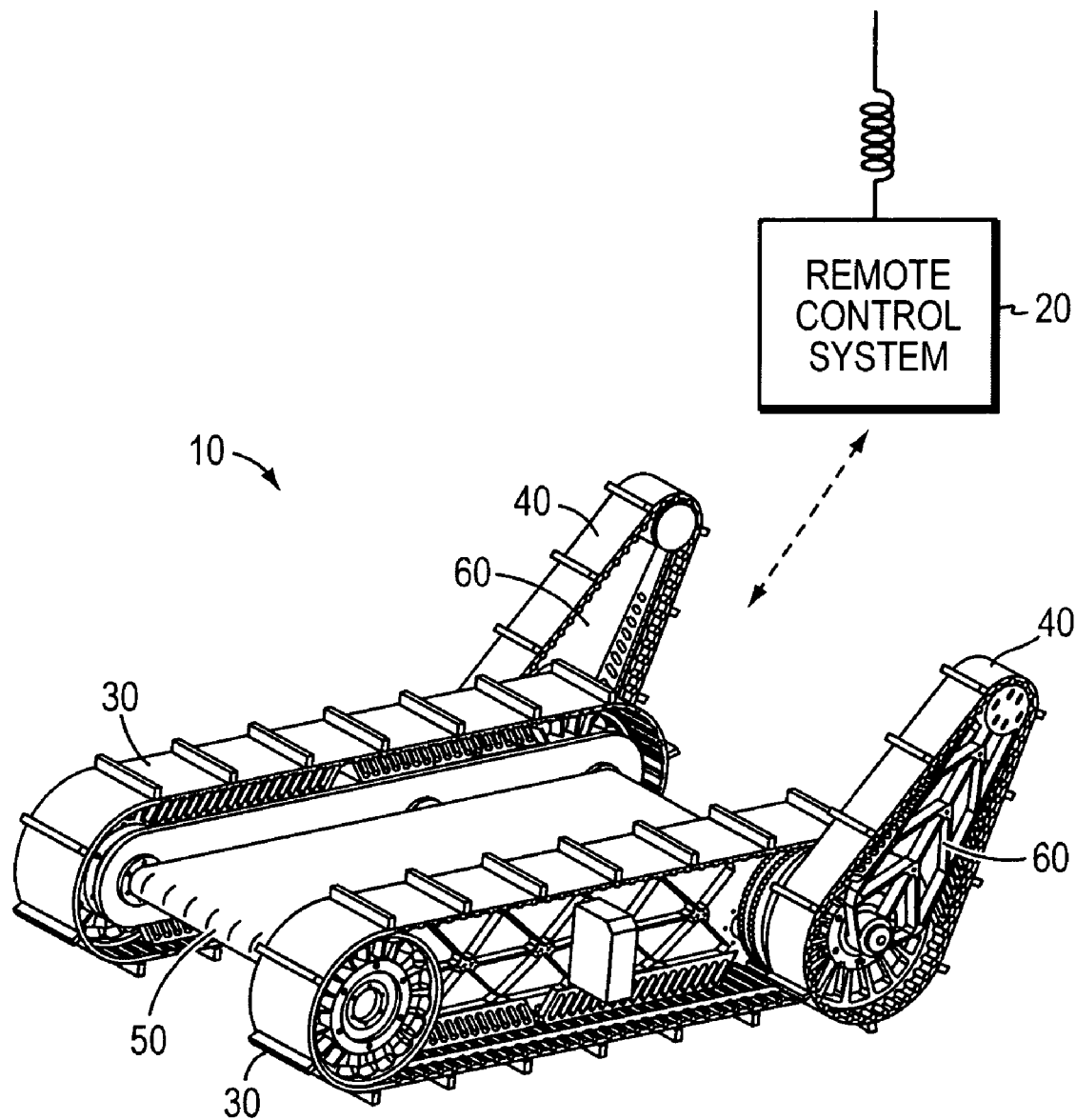
FIG. 1 is schematic perspective view of a remote controlled robotic device, in accordance with one embodiment of the invention.

FIG. 1 shows an example mobile robotic device, as disclosed in U.S. Pat. No. 6,263,989. In FIG. 1, a mobile robotic device 10 can be controlled by a remote control system 20. The remote control system 20 allows an operator to control the robotic device 10 from a distance. The operator can select different levels of human control over the robot, ranging from a tele-operation mode, in which the operator directly controls the motors and actuators on the robot, to autonomous operation, in which the operator passes higher-level command to the robot. In partially autonomous operation, the robot device 10 can perform tasks such as, but not limited to, following a wall, recovering from being stuck in an opening or due to high centering on an obstruction, evading a moving object, or seeking light.

The robotic device 10 moves around its environment on a pair of parallel main tracks 30 and a pair of tapered forward tracks 40. The main tracks 30 are mounted on a main chassis 50 of the robotic device 10. The robotic device 10 can be articulated, with the forward tracks 40 mounted on a pair of pivoting elongated arms 60, which are pivotally attached to the main chassis 50 and can be positioned at any angle to main chassis 50. The elongated arms 60 can be located at either the front of the robotic device, as shown, or at the rear of the robotic device 10. In an alternative embodiment, the elongated arms 60 can be positioned at any other location between the front and rear of the robotic device 10. Each elongated arm 60 has a length sufficiently long to allow the forward section to extend below the main chassis 50 in at least some degrees of rotation of the elongated arm 60, and a length shorter than the length of the main chassis 50. In this example embodiment, the elongated arms 60 can rotate through 360°, thus allowing the robotic device 10 to carry out maneuvers such as, but not limited to, climbing stairs and traversing obstacles. The two elongated arms 60 can be configured to rotate about the transverse angle together, or separately, depending upon the requirements of the operator, or the specific situation. The center of mass of the main chassis 50 is located forward of the rearmost point reached by the end of the elongated arm 60 in its pivoting about the transverse axis. The main chassis 50 is contained within the volume defined by the main tracks 30 and is symmetrical about a horizontal plane, thereby allowing inverted operation of the robot.

The robotic device 10 can be designed to move about in a variety of environments, including an urban environment of buildings (including staircases), streets, underground tunnels, and building ruble, as well as in vegetation, such as through grass and around trees. The robotic device 10 can have a variety of features which provide robust operation in these environments, including, but not limited to, impact resistance, tolerance of debris entrainment, and invertible operability. The design of the robotic device 10 is symmetrical about a horizontal plane so that it looks the same upside down and can operate identically in either orientation. Therefore, the robot can recover quickly from a tumble or fall in which it is inverted.

Figure 2:
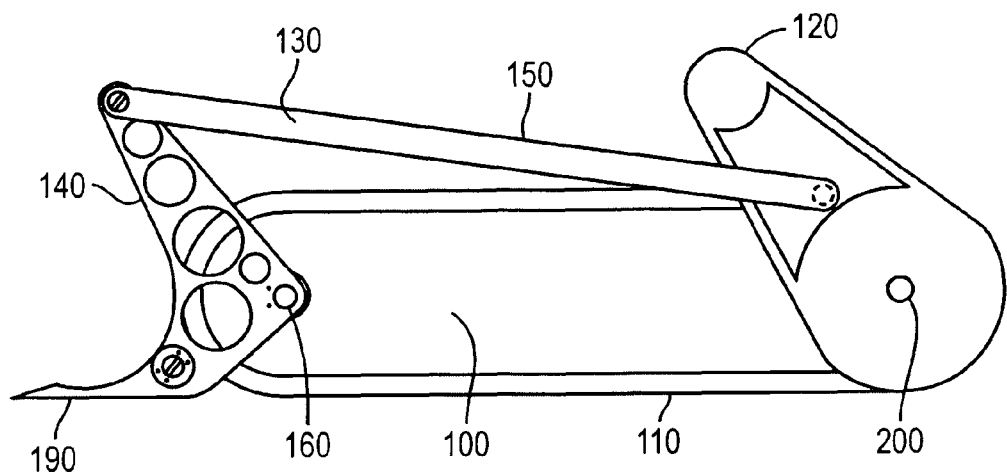
FIG. 2 is a schematic perspective side view of a lifting apparatus mounted to a remote controlled robotic device, in accordance with one embodiment of the invention.
Figure 3:
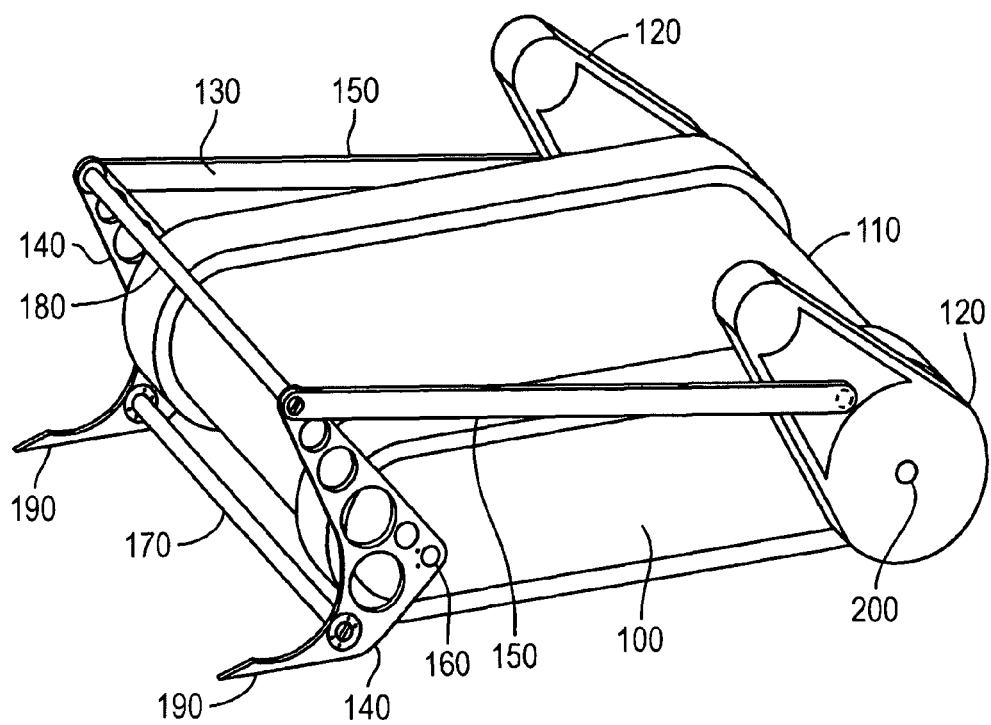
FIG. 3 is a schematic perspective view of the robotic device and lifting apparatus of FIG. 2.

An example lifting apparatus mounted to a robotic device can be seen in FIGS. 2 and 3. In this embodiment, the robotic device is an articulated tracked vehicle 100 that consists of a main tracked chassis 110 and a pair of elongated arms 120, and is configured to articulate in the manner described above for the example remote controlled robotic device 10 of FIG. 1. A lifting apparatus 130 is pivotably connected to the articulated tracked vehicle 100. The lifting apparatus 130 consists of a pair of pivoting members 140 that pivotably connect to the main tracked chassis 110 of the articulated tracked vehicle 100 at the rear axle 160, though other connection points are contemplated. The pivoting members 140 are pivotably connected at a location removed from the rear axle 160 to a pair of linkage arms 150, which in turn pivotably connect to the elongated arms 120 of the articulated tracked vehicle 100.

Each pivoting member 140 includes a lifting tine 190 located at a lower portion of the pivoting member 140. In one embodiment of the invention, the lifting tines 190 are connected by a lower transversely disposed support arm 170 that can pivot with the pivoting members 140 about the rear axle 160. This lower transversely disposed support arm 170 can provide additional stability to the lifting apparatus 130. The lower transversely disposed support arm 170 can also be used as a block to limit the range of pivot of the lifting tines 190 by, for example, stopping the pivoting member 140 pivoting further in a negative direction once the lower transversely disposed support arm 170 contacts the ground.

Further stability and strengthening of the lifting apparatus 130 can be provided by an upper transversely disposed support arm 180, linking the upper portions of the pivoting members 140 at the location at which the pivoting members 140 pivotably connect to the linkage arms 150. The upper transversely disposed support arm 180 can also be used to limit the upper pivot angle at which the pivoting members 140 may achieve, by stopping the pivoting members at the angle at which the upper transversely disposed support arm 180 contacts the main tracked chassis 110.

The connections between the linkage arms 150 and both the elongated arms 120 and the pivoting members 140 may be made through connectors including, but not limited to, pin joints, ball socket joints, or other rotational connections. These connections may be permanently or semi-permanently affixed to the robotic device 100, or be quick release connections that can allow the lifting apparatus 130 to be quickly and easily attached to, and removed from, the robotic device 100. In an alternative configuration, the linkage arms 150 may be connected to a separate force providing source, rather than the existing elongated arms 120, to provide the articulation motion for the pivoting members 140 and lifting tines 190.

In operation, as the elongated arms 120 rotate around the front axle 200 of the main tracked chassis 110 of the vehicle 100, the linkage arms 150 are driven forwards or backwards. This in turns causes the pivoting members 140 to pivot about their pivot points on the rear axle 160 of the vehicle 100. Operational stability is provided by the upper and lower transversely disposed support arms 170, 180, linking the pivoting members 140. By pivoting the elongated arms 120 towards the center of the main tracked chassis 110, the pivoting members 140 are forced to pivot downwards towards the ground, allowing the ends of the lifting tines 190 to be slid under an object to be lifted, such as, but not limited to, ordnance, a suitcase, a box, or another object. By pivoting the elongated arms 120 back away from the center of the main tracked chassis 110, the pivoting members 140 are forced to pivot upwards away from the ground, thus allowing the lifting tines 190 to support the object and lift it off the ground. The object can then be carried on the vehicle 100 from one location to another through articulation of the tracks on the main frame of the robot. Further manipulation of the elongated arms 120 allows the object to be placed back onto the ground or onto another body.

The lifting tines 190 have a pointed end followed by a shallow ramp, which leads to a cradle portion. This configuration allows the tips of the lifting tines 190 to slide under an object to be lifted, after which the pivoting members 140 can be pivoted back to allow the object to be supported within the cradle portion of the lifting tines 190. In alternative embodiments of the invention, the shape of the lifting tines 190 may be different, depending upon the type of object to be lifted. This may be achieved by providing alternatively shaped pivoting members 140 with lifting tines 190 of the required shape, or by providing a mechanism for releasably attaching different shaped lifting tines 190 to the pivoting members 140. For example, in certain embodiments, releasable and replaceable pivoting tines 190 can be attached to the pivoting members 140 through a pin, thread, slot, or other appropriate connecting structure.

The components of the lifting apparatus 130 can be manufactured from metal, such as, but not limited to, aluminum or steel, plastics, wood, composites, or other material with appropriate weight and strength characteristics. The structure of each component can also be chosen based on the required strength and weight requirements of a specific lifting apparatus 130. These structural elements can include stiffening elements such as "T," "L," or "I" shaped bars, or provide different materials at structurally important locations. The weight of the lifting apparatus can be advantageously reduced by using hollow bars and/or elements, and by removing unnecessary material where the strength of the structure is not adversely effected.

Figure 4:
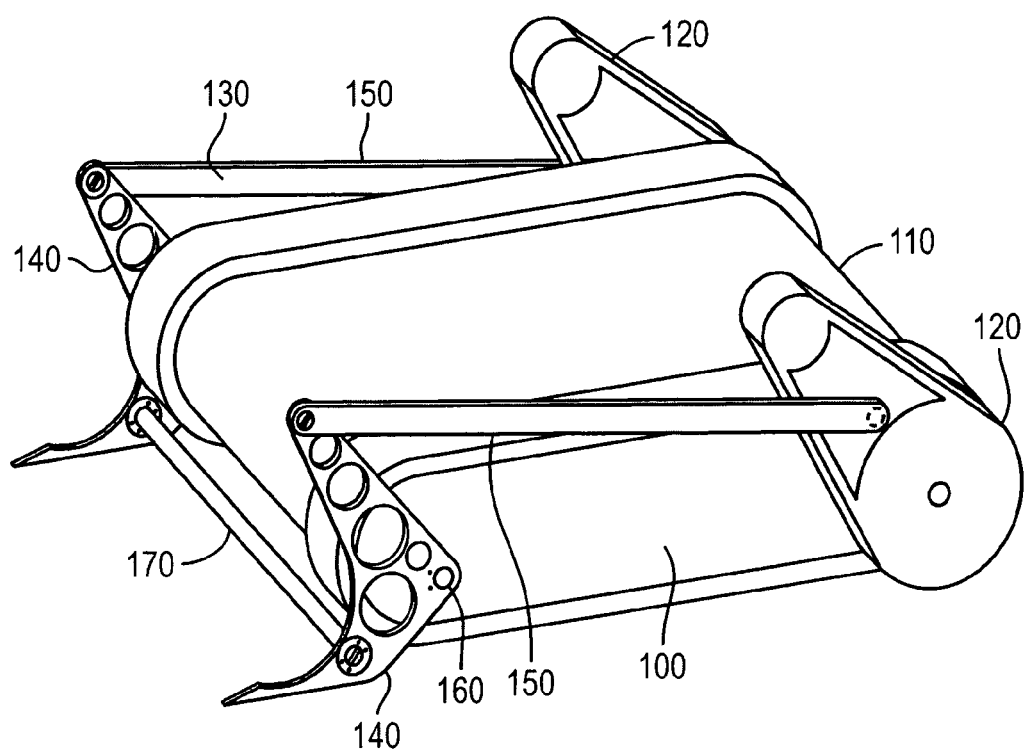
FIG. 4 is a schematic perspective view of a robotic device with an alternative lifting apparatus, in accordance with one embodiment of the invention.

FIG. 4 shows an alternative embodiment of the lifting apparatus 130 of FIGS. 2 and 3, with the upper transversely disposed support arm 180 removed. This may be advantageous in certain embodiments to allow for a greater range of rotation of the lifting apparatus 130. In further alternative embodiments both the upper and lower transversely disposed support arms 170, 180 can be removed, thus giving the lifting apparatus 130 a greater range of rotation in both the positive and negative directions of rotation. Removing both the upper and lower transversely disposed support arms 170, 180 can also allow the two pivoting members 140 to pivot independently of each other, or allow the lifting apparatus 130 to only be connected to one side of the articulated tracked vehicle 100.

The components of the lifting apparatus 130 are modular in nature and can be replaced or augmented with additional effectors and digging or other tools suitable for a particular application. In alternative configurations, differently shaped lifting tines 190, or tools other than lifting tines 190, can be attached to the pivoting members 140. For example, the lifting tines 190 can be replaced by tools or end effectors including, but not limited to, a wire-cutter, a hammer, a trowel, a shovel, or other digging device, a rake, a hook, a gripping mechanism, a reel, a camera, a metal detector, an x-ray source, a light source, a knife, a probe, a sensor (either optical, chemical, electrical, force, or otherwise), a weapon, a release mechanism, or a launcher. In some configurations, different tools can be attached to each pivoting member 140, allowing the apparatus 130 to carry out multiple tasks or functions. This may be particularly advantageous in configurations where the pivoting members 140 are free to pivot independently. End effectors that require power, such as, but not limited to, sensors or cameras, can be provided power from the articulated tracked vehicle's 100 power source, or from a separate battery or other power source.

Figure 5:
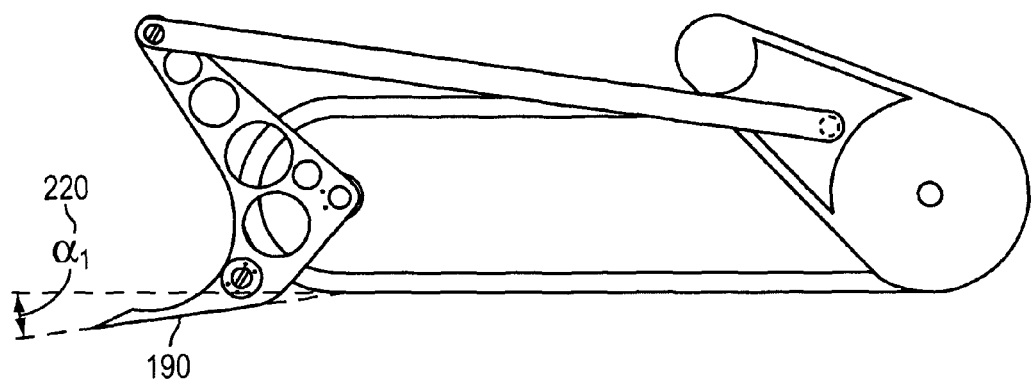
FIG. 5 is a schematic perspective side view of the robotic device and lifting apparatus of FIG. 2, with the tines of the apparatus extended downwards.

FIG. 5 shows the tracked articulated vehicle 100 and lifting apparatus 130 of FIGS. 2 and 3 with the elongated arms 120 rotated towards the center of the main tracked chassis 110, resulting in the lifting tines 190 being pivoted down below the horizontal (i.e., the ground plane of the main tracked chassis 110) by a small angle $\alpha_1$ 220. Allowing the lifting tines 190 to pivot down to an angle below the horizontal enables the tines to slide below an object to be lifted without disturbing the object prior to the pivoting members 140 being rotated upwards to lift the object off the ground. Positive downpressure can be provided to allow the weight of the articulated tracked vehicle 100 to assist this function. This is particularly advantageous when the object is located on soft ground, such as, but not limited to, soil, grass, or sand, where the lifting tines 140 can easily cut through the ground and be positioned below the object without disturbing it. This can also be useful in detecting and exposing wires, cables, mines, or other objects located below the surface. In one example embodiment, the lifting tines 190 are configured to cut down below the horizontal surface by up to one inch or more. This can also be advantageous in configurations where one or more lifting tines 190 have been replaced by a different tool, such as, but not limited to, a digging tool.

Figure 6:
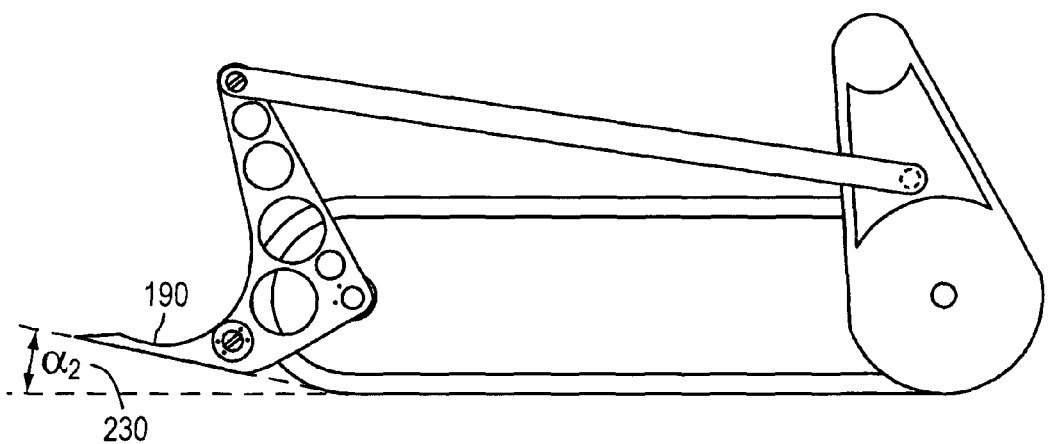
FIG. 6 is a schematic perspective side view of the robotic device and lifting apparatus of FIG. 2, with the tines of the apparatus retracted upwards.

FIG. 6 shows the tracked articulated vehicle 100 and lifting apparatus 130 of FIGS. 2 and 3 with the elongated arms 130 rotated away from the center of the main tracked chassis 110, resulting in the lifting tines 190 being pivoted up from the horizontal by a small angle $\alpha_2$ 230. In this position, the vehicle 100 is free to travel on the tracked articulations of its main tracked chassis 110 and safely move an object supported on the lifting tines 190 to a location designated by a remote user.

Figure 7:
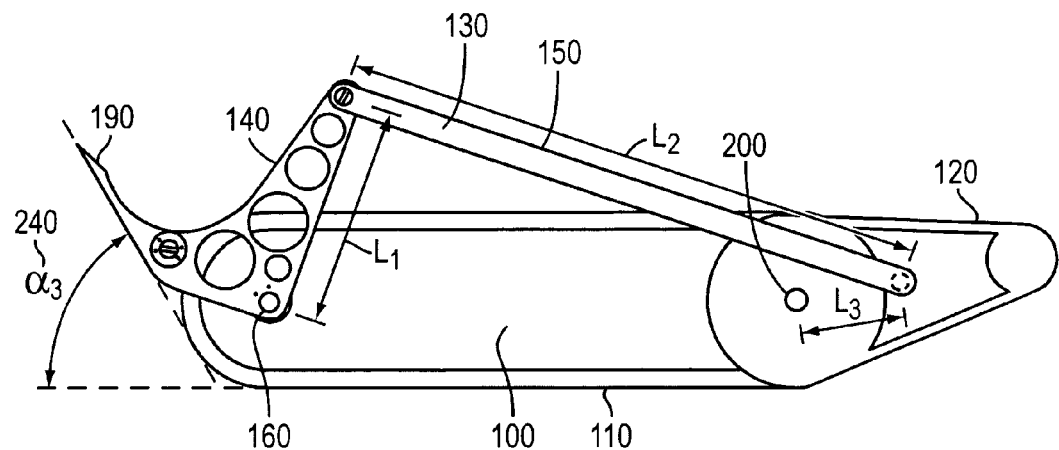
FIG. 7 is a schematic perspective side view of the robotic device and lifting apparatus of FIG. 2, with the tines of the apparatus retracted upwards to a substantially maximum extent.

FIG. 7 shows the tracked articulated vehicle 100 and lifting apparatus 130 of FIGS. 2 and 3 with the elongated arms 120 rotated back from the center of the main tracked chassis 110, and pointing substantially away from the main tracked chassis 110, resulting in the lifting tines 190 being pivoted further up from the horizontal by a large angle $\alpha_3$ 240. The range of angles, and the specific values of the maximum and minimum angles that the pivoting member 140, and therefore the lifting tines 190, may turn through is dependent upon the set lengths of the components of the lifting apparatus 130, and specifically the length from the rear axle 160 to the pivotable linkage between the pivoting member 140 and the linkage arm 150, the length of the linkage arm 150, and the length from the front axle 200 to the pivotable linkage between the elongated arm 120 and the linkage arm 150. These lengths are defined in FIG. 7 as $L_1$, $L_2$, and $L_3$, respectively.

Figure 8:
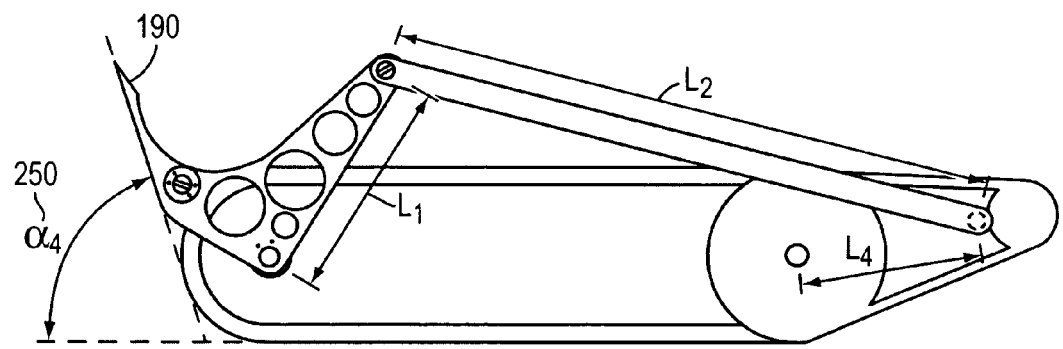
FIG. 8 is a schematic perspective side view of the robotic device and lifting apparatus of FIG. 2, with the tines of the apparatus retracted upwards to a substantially maximum extent in an alternative configuration.

By selection of the lengths $L_1$, $L_2$, and $L_3$, the range of angles through which the pivoting member 140 rotates, and the minimum and maximum angles at which the pivoting member 140, and therefore the lifting tines 190, can achieve, may be set. This can be advantageous for configurations where the lifting apparatus 130 is required to carry out multiple tasks that may require different angles or ranges of angles for the pivoting members 140. An example variation due to a change in one of the lengths of the lifting apparatus 130 can be seen in FIG. 8. Here, the tracked articulated vehicle 100 and elongated arms 120 are in the same position as for FIG. 7, with the lengths $L_1$, and $L_2$ also the same as for FIG. 7. However, the length from the front axle 200 to the pivotable linkage between the elongated arm 120 and the linkage arm 150 has been increased from length $L_3$ to $L_4$. This length change results in the lifting tines 190 being pivoted up from the horizontal by a larger angle $\alpha_4$ 250.

The lengths $L_1$, $L_2$, and $L_3$ can be set to various lengths to provide a number of different ranges of motion. In the example embodiment shown in FIGS. 2-7, the relative lengths are set such that the angle between the sole of the lifting tines 190 and the horizontal ranges over 71° from −18° to 53°, as the elongated arms 120 rotate through 360°. Varying the lengths $L_1$, $L_2$, and $L_3$ can result, in alternative embodiments, in a range of pivot of anything from 0° to 360°, with any appropriate minimum and maximum angle between the lifting tines 190, or other tool, and the horizontal. By limiting the range of motion of the pivoting member 140, the articulated tracked vehicle 100 can be free to articulate through its full range of motion, including a 360° rotation of the elongated arms 120, without interference from the lifting apparatus 130.

The difference in the lengths $L_1$, $L_2$, and $L_3$ can also be important in providing a mechanical advantage to the lifting apparatus, such that the torque produced by the pivoting members 140 is greater than that of the elongated arms 120 providing the motion. As a specific example, a length $L_1=9$ inches and $L_3=4$ inches provides a 2.25:1 increase in torque for the pivoting members 140 relative to the torque provided by the elongated arms 120. In alternative configurations, the lifting apparatus 130 can provide mechanical advantages of greater than 2.5:1.

In an alternative embodiment, the pivotable link between the elongated arm 120 and the linkage arm 150 can be slotted, for example by providing a slotted connection on the elongated arm 120. This slotted connection can be a part of the elongated arm 120, or be a permanently or releasably affixed attachment to the elongated arm 120. A further slotted portion may be placed one or both ends of the linkage arm 150. A still further slotted portion may be placed on the pivoting member 140, at the pivotable link between the pivoting member 140 and the linkage arm 150. By providing one or more of the above mentioned slotted linkages, the minimum and maximum pivot angles, and the range of pivot, of the pivoting member 140 and attached lifting tines 190 can be quickly changed, without having to remove the lifting apparatus 130 from the articulated tracked vehicle 100. This can be advantageous when the lifting apparatus 130 is required to perform various functions and/or use a variety of different releasably attached tools.

Other methods of varying the lengths $L_1$, $L_2$, and $L_3$, to provide different pivot angles and ranges, can be used in alternative embodiments of the invention. These methods include, but are not limited to, the use of telescoping members or threaded members such as turnbuckles, or providing a set number of attachment locations on one or more of the components, allowing the adjoining component to be pivotably affixed at a number of locations. The multiple linkage locations can be a permanent feature of the vehicle 100 or be added by attaching, either permanently or releasably, attachments that include the multiple linkage locations. In alternative embodiments, the pivotable linkage location between the pivoting member 140 and the main tracked chassis 110 can also be moved in a slotted connection, or other appropriate movable connector. The actual pivoting linkages between the separate components can be pinned, threaded, hooked or otherwise engaged. The linkages can be permanently affixed, or be configured for quick release and engagement.

In one example embodiment, the entire lifting apparatus 130 can be assembled on the articulated tracked vehicle 100, or removed from the vehicle 100 for storage, in under 60 seconds. By providing quick release attachments between each of the linkages of the lifting apparatus 130, the apparatus 130 can be completely disassembled for easy storage. Alternatively, other kinematic systems can be employed using multiple linkages on each side of the robot to control tine motion in a desired manner.

Figure 9:
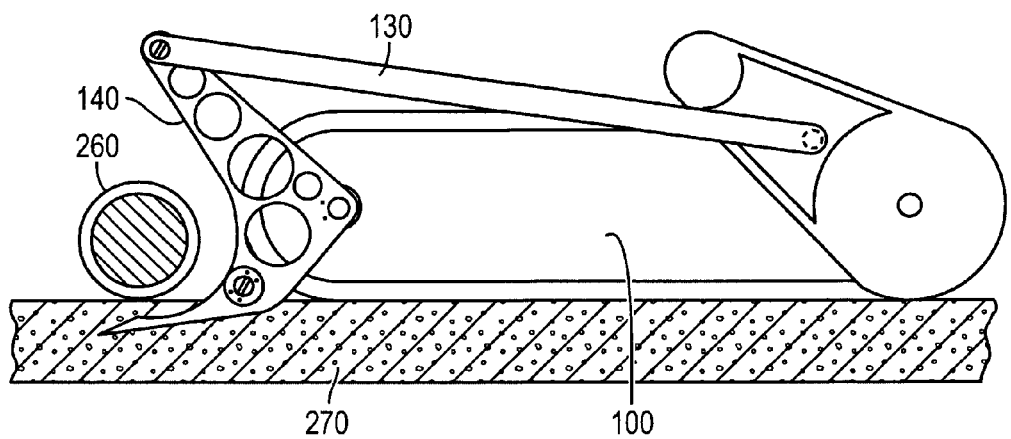
FIG. 9 is a schematic perspective side view of the robotic device and lifting apparatus of FIG. 2, with the tines of the apparatus extended downwards below an object.
Figure 10:
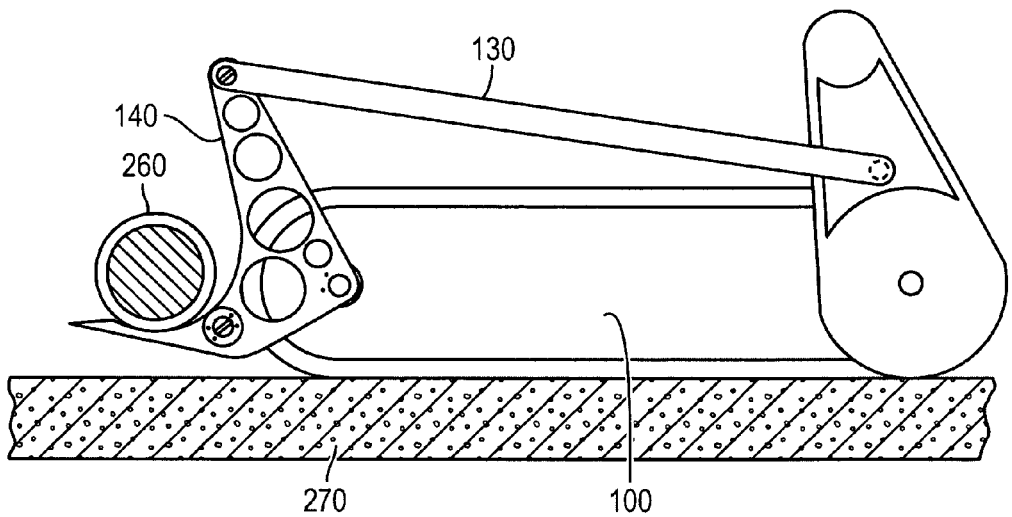
FIG. 10 is a schematic perspective side view of the robotic device and lifting apparatus of FIG. 2, with the tines of the apparatus retracted upwards and supporting an object.

FIGS. 9 and 10 show the articulated tracked vehicle 100 and lifting apparatus 130 performing the method of lifting and supporting an object 260, in this case an ordnance, with the lifting tines 190. In this example, the object 260 is resting on a soft soil surface 270, which allows the lifting tines 190 to press down into and below the surface 270. FIG. 9 shows the vehicle 100 with the lifting tines 190 forced downwards, such that the ends are below the surface 270. To position the lifting apparatus 130 to lift an object 260, the lifting tines 190 are pressed into the surface in front of the object 260. The vehicle 100 can then move forward towards the object 260 and position the lifting tines 190 directly below the object 260, without unnecessarily disturbing the object 260. FIG. 9 shows the vehicle 100 in the process of pushing the lifting tines 190 forward beneath the object 260.

Once the lifting tines 190 are in position beneath the object 260, the pivoting members 140 can be rotated to lift the object 260 with the lifting tines 190. The pivoting members 140 can be pivoted upwards to any angle required to stabilize the object 260 on the lifting tines 190, and to lift the object 260 and lifting tines 190 clear of the surface 270. The vehicle 100 is then free to move and transport the object 260 to a different location. Upon reaching the required location, the object 260 can be placed back on the ground by lowering the lifting tines 190 and backing the vehicle 100 away from the object 260. In an alternative embodiment of the invention, the pivoting members 140 and lifting tines 190 can be configured to pivot the object 260 up above the vehicle 100 and drop or place the object onto a holding device placed on top of the vehicle 100.

In order to maximize the weight of object the articulated tracked vehicle 100 can lift and carry, the lifting of the ordnance should be performed as close to the vehicle 100 as possible. By locating the lifting point close to the vehicle 100, the lifting apparatus 130 can lift and support an object whose weight potentially exceeds that of the vehicle 100, such that the vehicle 100 remains on the ground while lifting the object, rather than the object staying on the ground and the vehicle 100 being lifted off the ground. If the object weighs twice that of the vehicle 100, the center of gravity of the vehicle 100 should be at least twice the distance from the closest point where the drive wheels and/or tracks of the vehicle 100 contact the ground relative to the position of the center of gravity of the object.

In order to safely cradle the ordnance or other heavy object, the design of the lifting apparatus 130 and its lifting tines 190 can be configured such that the object remains supported by the lifting apparatus 130 while the articulated tracked vehicle 100 is transporting the object. The placement of the pivot point in the center of the rear wheels of the articulated tracked vehicle 100 places the ordnance very close to the vehicle 100, while also progressively increasing the cradling effect on the object as it is lifted higher. The design of the lifting apparatus 130, due to the pivoting member 140 rotating around the rear axles of the vehicle 100, has the effect of moving the center of gravity of the object closer to the center of gravity of the vehicle 100 during the latter part of the lift travel. This has the effect of improving the vehicle's 100 driving dynamics, even while carrying a significant weight near one end.

As a specific example embodiment of the invention, an articulated tracked vehicle, in this case the commercially available robotic device available from iRobot Corporation, Burlington, Mass. under the trade name PackBot® robot, is configured with a lifting apparatus 130 to lift a 155 mm artillery shell. The artillery shell weighs approximately 70 to 100 lb, which is approximately twice the weight of the PackBot® robot. However, by careful design of the lifting apparatus, the PackBot® robot can lift and move the 155 mm artillery shell without difficulty. In one such example embodiment, a 48 lb robotic device can lift and support a 96 lb artillery shell.

The articulated tracked vehicle 100 and lifting apparatus 130 can also be configured to lift objects that are placed on hard surfaces such as, but not limited to, concrete. In this case, the lifting tines 190 cannot press into the surface and be positioned under the object without disturbing it. As a result, other techniques, and possibly differently shaped lifting tines 190 may be required to move the object onto the lifting tines 190. For example, in one embodiment the lifting tines 190 can have a very pointed end followed by a shallow ramp, which leads to a cradle portion. This geometry may allow the robot device 100 to slide an object resting on a hard surface into the lifting tine 190 cradles, or to force the lifting tines 190 under the object without it being pushed away. This task may be especially difficult for cylindrical objects such as artillery shells or ordnance, that can roll away from the vehicle 100 as the lifting tines 190 are slid under the ordnance. One solution to this problem is to force the lifting tines 190 under the ordnance while the ordnance is restricted in its movement by environmental features such as a curb, rock, building, etc. If necessary, the vehicle 100 can use the lifting apparatus 130 to roll the ordnance to an appropriate environmental feature in order to carry out this task.

An alternative solution is to provide a technique wherein the vehicle 100 and the lifting apparatus 130 are moved in a specific motion to force the object onto the cradles of the lifting tines 190. For example, the lifting tines 190 can be slowly moved into position directly in front of the object, at which time the vehicle 100 is thrust forward rapidly to force the lifting tines under the object before enough momentum is built up to allow the object to roll away. The pivoting members 140 are then pivoted back to hold the object in place in the cradles of the lifting tines 190. This, or any other appropriate action, can be performed through a preprogrammed routine that is installed in either the vehicle's 100 embedded control systems or in a remotely located control system that communicates instructions with the vehicle 100. Alternatively, the required motions of the vehicle 100 and lifting apparatus 130 can be communicated directly to the vehicle 100 through control inputs selected by a user operating a remotely located control system. Devices such as, but not limited to, a camera may be located on the vehicle 100 or lifting apparatus 130 to provide a visual image of the object, and surrounding area, to a remote user. Further feedback to the user, such as, but not limited to, proximity sensors, force sensors, absolute position sensors, or other appropriate sensors or devices, may also be attached to the vehicle 100, and/or lifting apparatus 130 to assist in the remote user positioning the vehicle 100 and lifting the object of interest.

In further alternative embodiments, other tasks and motions of the vehicle 100 and lifting apparatus 130 can be carried out using preprogrammed routines installed in either the vehicle's 100 embedded control systems or in remotely located control systems. For example, in configurations where a sensor, or a number of sensors, is placed on the lifting apparatus 130, either instead of or in addition to the lifting tines 190, a preprogrammed function may be triggered within the vehicle 100 and lifting apparatus 130 upon a specific object, phenomena, or signal being detected by the sensor.

Figure 11:
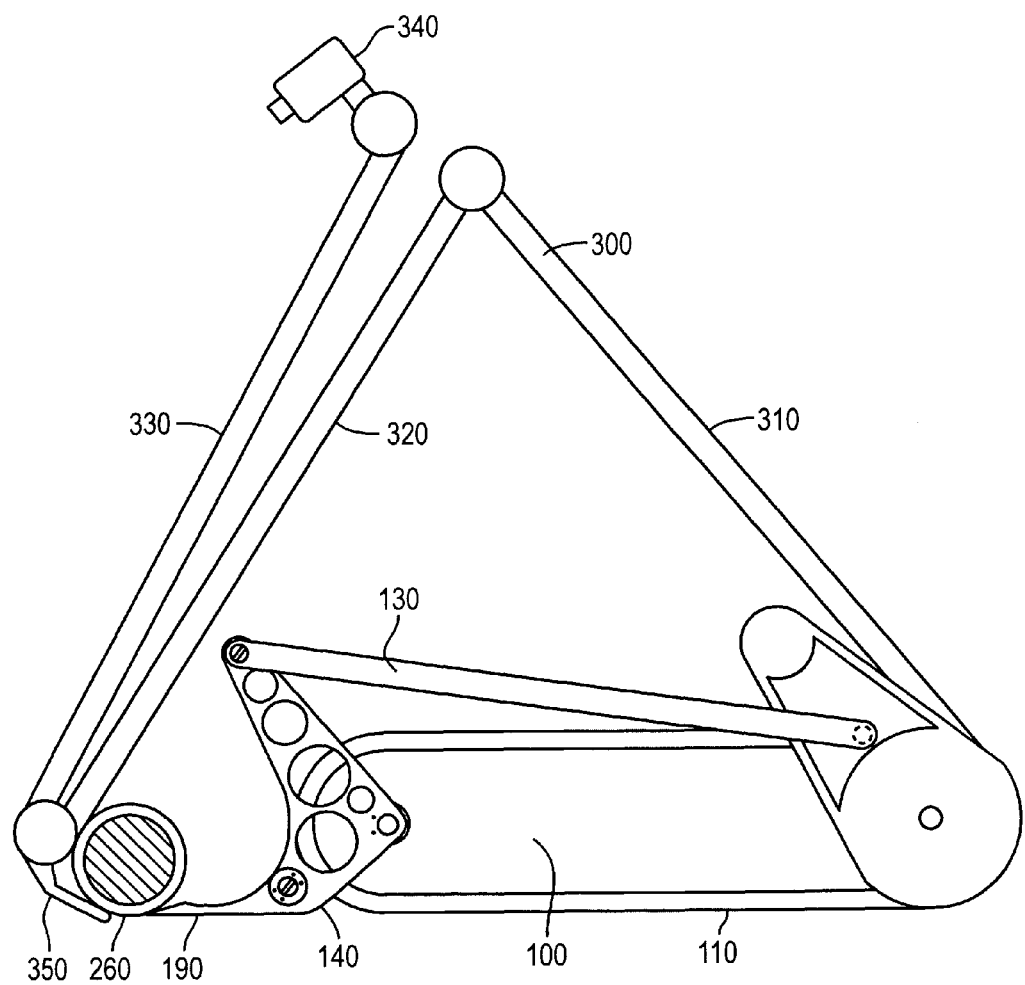
FIG. 11 is a schematic perspective side view of a lifting apparatus and robotic manipulator arm mounted to a remote controlled robotic device, in accordance with one embodiment of the invention.

An alternative embodiment of the invention, wherein the articulated tracked vehicle 100 also includes an attached robotic manipulator arm, can be seen in FIG. 11. In this configuration, the manipulator arm 300 is connected to the main chassis 110 of the articulated tracked vehicle 100 between the elongated arms 140. A first section 310 or the manipulator arm 300 is pivotably mounted to the main chassis. A second section 320 is connected by a pivoting connector to the distal end of the first section 310. A third section 330 is connected by a pivoting connector to the distal end of the second section 320. A camera 340 is located on a pivoting mount at the end of the third section 330 of the manipulator arm 300.

The pivoting connectors have powered axes that can allow the sections of the manipulator arm 300 to pivot with respect to each other along the central axial plane of the articulated tracked vehicle 100, or in an alternative embodiment allow the arms to pivot in more than one axis of rotation. The camera 340 may also be allowed to pivot in the axial plane of the vehicle, or be configured to pivot in multiple axes of rotation. In alternative embodiments of the invention, the camera 340 can be replaced by, or be associated with, another device, such as, but not limited to, a knife, a probe, a sensor (either optical, chemical, electrical, force, or otherwise), an acoustical source, an x-ray source, a light source, a weapon, a metal detector, or a launcher. In this embodiment, an appendage 350 is connected to the manipulator arm 300 at the location of the pivoting connector between the second 320 and third 330 sections. This appendage 350 is shaped to act as a hook, but may, in alternative embodiments, take any appropriate form, such as, but not limited to, a gripping mechanism, a probe, or a sensor.

By controlling the position of the manipulator arm 300 with respect to the vehicle 100 and lifting apparatus 130, the appendage 350 can be used to assist in placing an object 260, such as an ordnance, onto the lifting tines 190 of the lifting apparatus 130. This can be achieved, for example, by applying a rolling or sliding force to the object 260, thereby forcing it into the cradles of the lifting tines 190. This may be particularly advantageous when lifting cylindrical objects, such as ordnance, on solid ground such as concrete, where the lifting tines 190 cannot penetrate the ground to be positioned under the ordnance without disturbing it. The manipulator arm 300 and appendage 350 can also be used to stabilize the object 260 on the lifting apparatus 130 while the object 260 is being transported, or to assist in removing the object 260 from the lifting tines 190 when the object 260 is to placed back on the ground or other surface.

Figure 12:
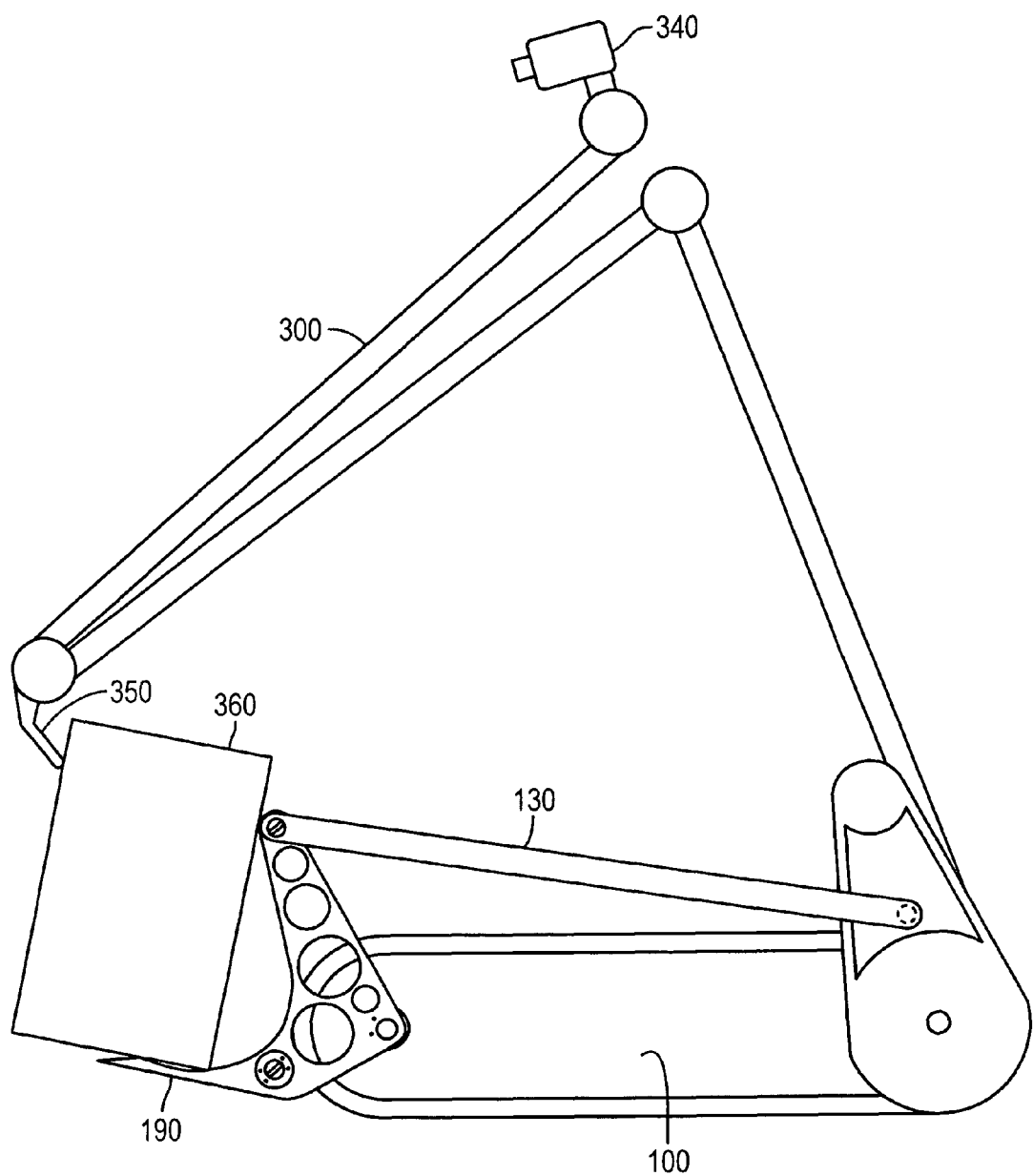
FIG. 12 is a schematic perspective side view of the lifting apparatus, robotic manipulator arm, and remote controlled robotic device of FIG. 11, supporting a large object.

A manipulator arm 300 can also be useful in assisting the vehicle 100 and lifting apparatus 130 in carrying larger objects, such as suitcases, boxes, bags, or other objects of different shape and size. FIG. 12 shows the embodiment of FIG. 11 carrying a larger object 360, in this case a box, which would be difficult to lift and support without a stabilizing force being applied. As above, the appendage 350 can be used to apply a force to the outer side of the object 360 to force the object 360 onto the lifting tines 190, and provide a stabilizing force to the object 360 while being transported by the vehicle 100.

In this embodiment of the invention, the camera 340 located at the end of the manipulator arm 300 may be used to provide a visual image of the object, and surrounding area, to a remote user. Further feedback to the user, such as, but not limited to, proximity sensors, force sensors, absolute position sensors, or other appropriate sensors or devices, may also be attached to the vehicle 100, lifting apparatus 130, and/or manipulator arm 300 to assist in the remote user positioning the vehicle 100 and lifting the object of interest. The camera, and/or other appropriate devices and sensors, can also be used to provide visual and/or other appropriate feedback to a remote user when transporting an object.

The use of the manipulator arm 300 to roll, slide, or guide the object 260 onto the lifting tines 190 in an automated fashion is also possible, in alternative embodiments of the invention. Due to the constrained geometric mounting position and actuation of the lifting apparatus 130, the vehicle 100 and lifting apparatus 130 can be equipped with absolute position sensors, or other appropriate sensing and/or positioning equipment, and software that supports coordinated motion routines to provide the vehicle 100 with the ability to automatically coordinate preprogrammed object 260 handling routines. For example the manipulator arm can be deployed in a series of pre-programmed moves to force a 155 mm artillery shell into the cradle of the lifting tines 190. As a result, to lift an object 260, an operator need only position the vehicle 100 in front of the object 260 to be lifted, and then initiate the preprogrammed handling routine to safely lift the object 260 without further user input or control being required.

Figure 13:
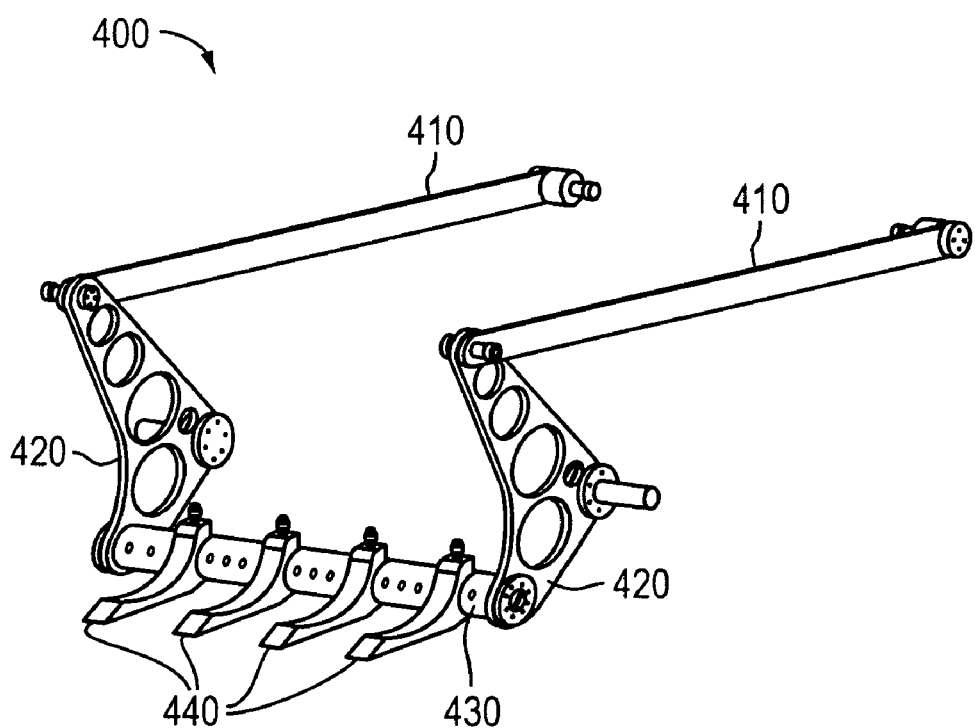
FIG. 13 is a schematic perspective view of an alternative lifting apparatus with detachable tines, in accordance with one embodiment of the invention.

An alternative lifting apparatus can be seen in FIG. 13. This embodiment works in a substantially similar manner to the example embodiments described in FIGS. 2-12, and can include any of the aspects or functions described above. In this embodiment of the invention the lifting apparatus 400 consist of a pair of linkage arms 410 that can attach to the elongated arms of a robotic device, such as the articulated tracked vehicle 100 shown in FIGS. 2-10. These linkage arms 410 are connected to a pair of pivoting members 420, that are configured to attach to, and pivot around, a transverse axis on the main chassis 110 of the articulated tracked vehicle 100. The pivoting members 420 are connected by a support arm 430, upon which a number of lifting tines 440 can be located. The lifting tines 440 include pin connectors, allowing them to be releasably attached to the support arm 430.

In this embodiment of the invention, the support arm 430 includes a number of mounting holes, allowing the lifting tines 440 to be placed at a number of locations and angles to the horizontal. These lifting tines 440, or other appropriate attachments, can be placed in a row at the same angle, or be located at different angles to the horizontal, depending upon the requirements of the user, and the particular function of each attachment. The lifting tines 440, or other appropriate attachments, can be placed at regular intervals along the support arm 430, or be spaced at varying intervals, depending upon the requirements of the user, and the particular function of each attachment. In one specific example embodiment, the holes are placed at one inch intervals along the length of the support arm 430, and configured to allow the lifting tines 440, or other appropriate attachments, to be angled at any 90° interval around the support arm 430. In another specific example, the support arm 430 can be configured to allow the lifting tines 440, or other appropriate attachments, to be angled at any 45° interval around the support arm 430. In alternative embodiments of the invention, a fewer or greater number of lifting tines 440 can be affixed to the support arm 430. In further alternative embodiments, the lifting tines 440, or other appropriate attachments, can be permanently affixed to the support arm 430. In yet further alternative embodiments, the pin attachments on the lifting tines 440 can be replaced by clamps, or other appropriate gripping mechanisms, allowing the lifting tines 440 to be positioned at any location and angle along the support arm 430.

Figure 14:
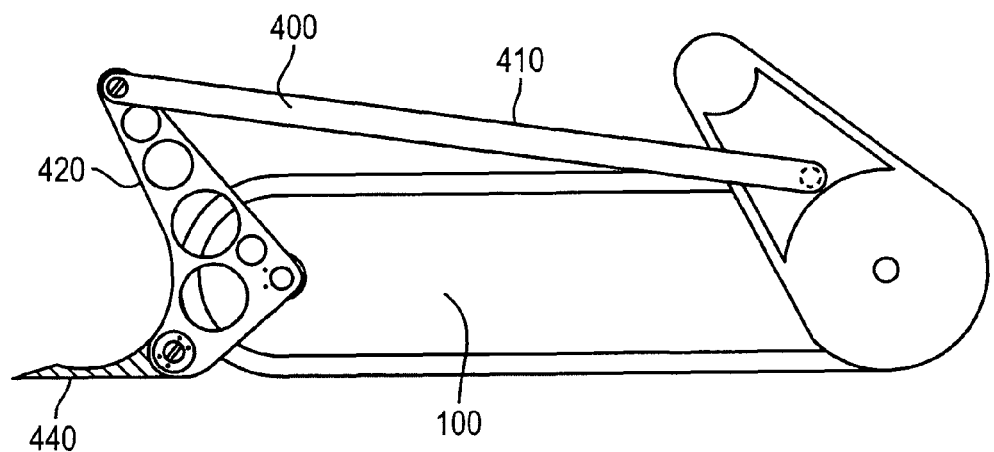
FIG. 14 is a schematic perspective side view of the alternative lifting apparatus of FIG. 13 attached to a remote controlled robotic device, in accordance with one embodiment of the invention.
Figure 15:
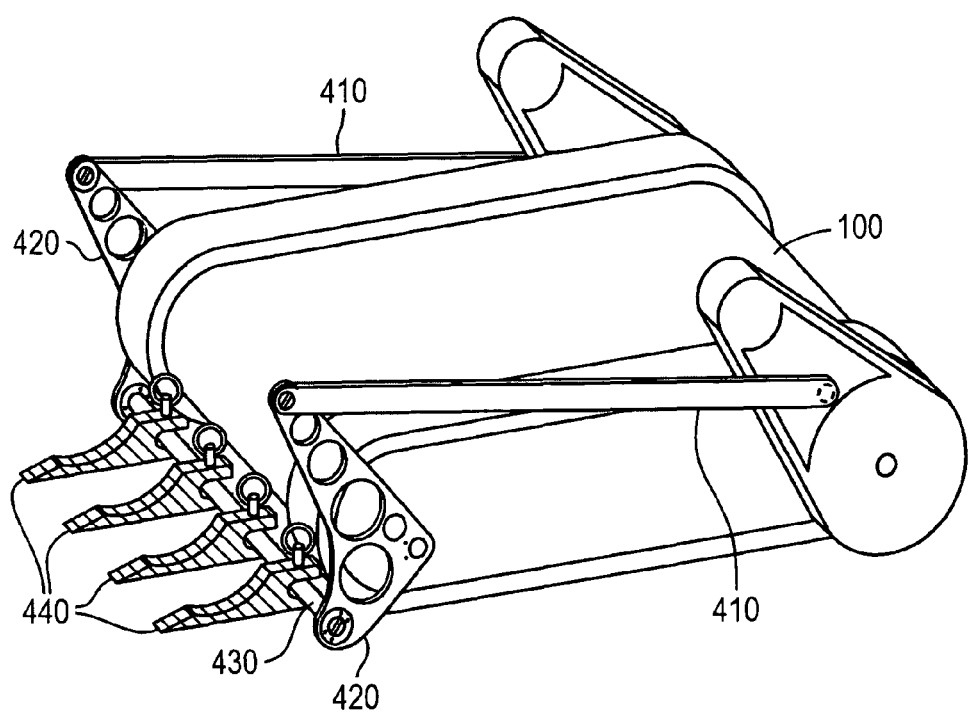
FIG. 15 is a schematic perspective view of the alternative lifting apparatus and remote controlled robotic device of FIG. 14.

FIGS. 14 and 15 show this lifting apparatus 400 affixed to the articulated tracked vehicle 100. The vehicle 100 articulates the lifting apparatus 400 in the same manner as described in the previous example embodiments. Again, a robotic manipulator arm 300 may be utilized in some embodiments to assist the lifting apparatus 400. As before, the lifting apparatus 400 may be permanently affixed to the vehicle 100, or be releasably affixed to the vehicle 100 using quick release connections or other appropriate pivotable mounting connectors. The example embodiment shown in FIG. 13 includes quick release connections for every joint, allowing the lifting apparatus 400 to be very quickly attached or dismantled, and allowing easy storage of the lifting apparatus 400 when not in use.

Figure 16A:
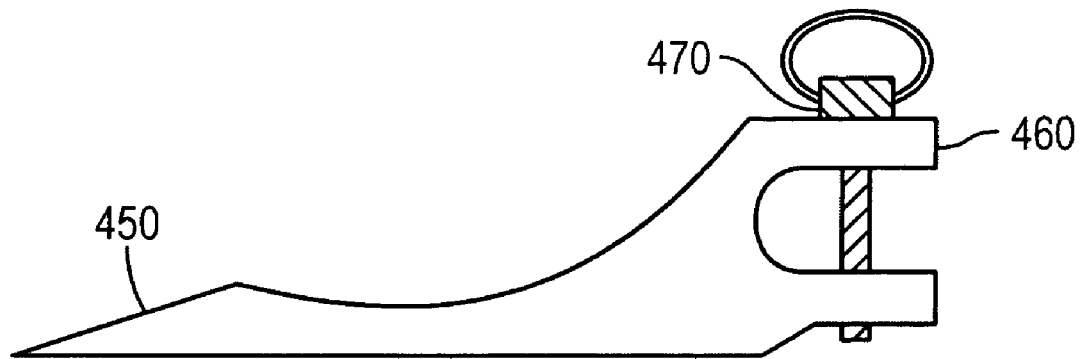
FIG. 16A is a schematic perspective side view of a detachable tine, in accordance with one embodiment of the invention.
Figure 16B:
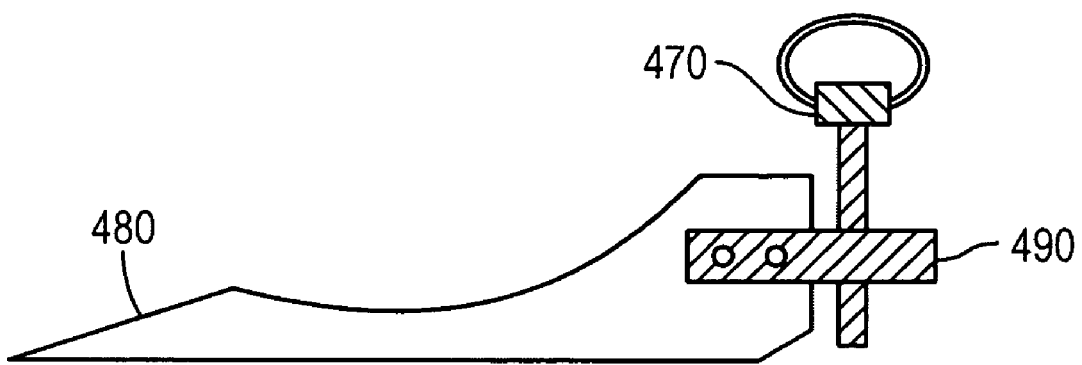
FIG. 16B is a schematic perspective side view of an alternative detachable tine, in accordance with one embodiment of the invention.

Example lifting tines, with differing releasable attachment mechanisms, are shown in FIGS. 16A and 16B. FIG. 16A shows a lifting tine 450 that can be attached to a support arm 430 through a bracket 460 and pin 470 arrangement. In this configuration, the bracket 460 fits around the support arm 430. Holes in the upper and lower projections of the bracket 460 can then be matched up with a hole in the support arm 430. The lifting tine 450 can then be held in place on the support arm 430 by placing a pin 470 in the holes in the bracket 460 and matching hole in the support arm 430. FIG. 16B shows a lifting tine 480 that can be attached to a support arm 430 through a rod 490 and pin 470 arrangement. In this configuration, the rod 490 is passed through a hole in the support arm 430. The rod 490 is then held in place by a pin 470 that passes through a perpendicular hole in the support arm 430 and though a corresponding hole in the rod 470.

In alternative embodiments, the lifting tines can be attached to the support arm 430 through mechanisms including, but not limited to, clamps, clasps, gripping mechanisms, threaded connections, magnetic connections, hooks, or other appropriate means. In alternative embodiments of the invention, other tools or devices can be attached to the support arm 430 in addition to, or in place of the lifting tines 440. These tools or devices can include, but are not limited to, a wirecutter, a hammer, a trowel, a shovel, a rake, a hook, a gripping mechanism, a reel, a camera, a metal detector, an x-ray source, a light source, a knife, a probe, a sensor (either optical, chemical, electrical, force, or otherwise), a weapon, a release mechanism, and a launcher.

Figure 16C:
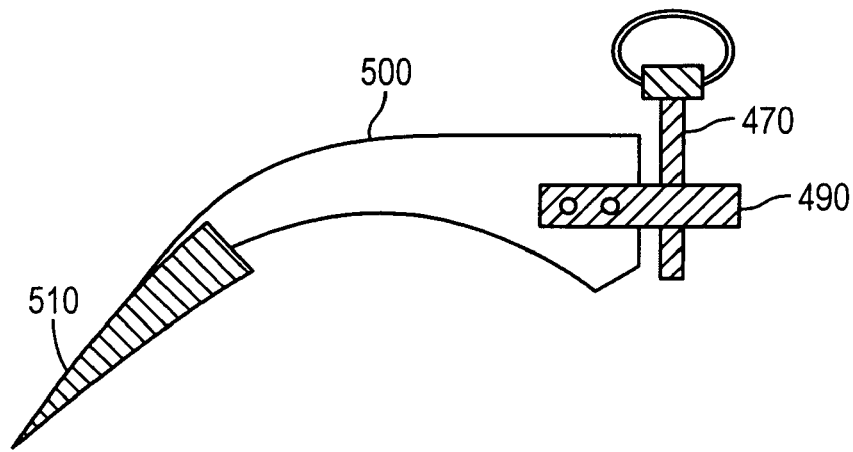
FIG. 16C is a schematic perspective side view of a detachable trowel, in accordance with one embodiment of the invention.
Figure 16D:
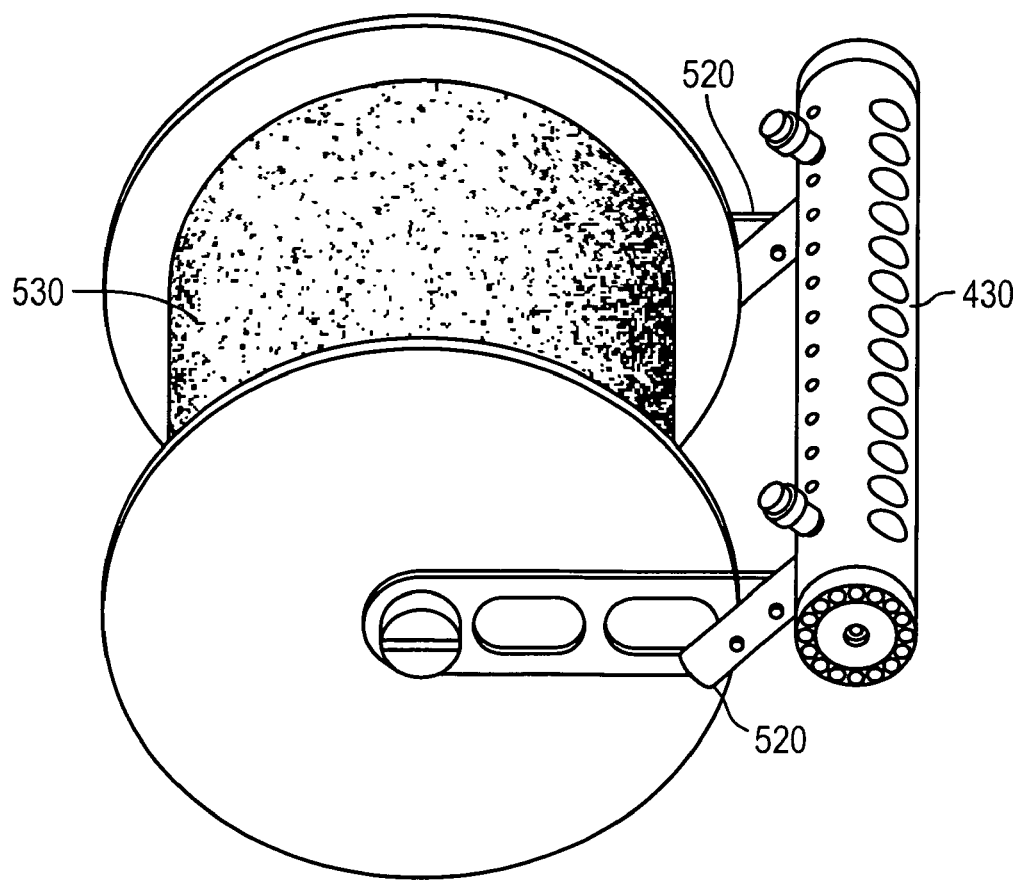
FIG. 16D is a schematic perspective side view of a detachable wire roll, in accordance with one embodiment of the invention.

Example alternative attachments for releasable connection with the lifting apparatus are shown in FIGS. 16C and 16D. FIG. 16C shows a trowel attachment, that may be essentially an inverted tine or inverted shovel, that can be used for probing or digging soil or other soft surface. The trowel 510 is held on a shaft 500 which can then be attached to a support arm 430 by the rod 490 and pin 470 arrangement of the lifting tine of FIG. 16B. A reel for laying wire or sheeting is shown in FIG. 16D. The reel 530 is held by a pair of brackets 520 to a support arm 430.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

It should be understood that alternative embodiments, and/or materials used in the construction of embodiments or alternative embodiments, are applicable to all other embodiments described herein.

What is claimed is:

1. A robotic vehicle comprising:
    a main chassis having two sides, a front end, and a differential drive system for maneuvering the robotic vehicle over a surface;
    a forward section comprising:
        at least one stair climbing arm having a proximal end and a distal end, the proximal end of the stair climbing arm being pivotally coupled to the main chassis near the front end of the main chassis about a transverse axis defined generally perpendicular to the sides of the main chassis, the stair climbing arm having a length less than a length of the sides of the main chassis, wherein the stair climbing arm articulates between positions to lift the front end of the vehicle to assist the robotic vehicle in climbing stairs and positions to traverse the front end of the vehicle over obstacles while moving about in a variety of environments;
    a lifting apparatus comprising:
        at least two pivoting members pivotably coupled to the main chassis; and
        at least one linkage arm pivotably connected to at least one of the pivoting members and to the at least one stair climbing arm; and
    an arm drive system disposed on the main chassis and coupled to the at least one stair climbing arm, the arm drive system pivoting the lifting apparatus relative to the main chassis by pivoting the stair climbing arm relative to the main chassis and the pivotally connected at least one linkage arm.

2. The robotic vehicle of claim 1, wherein the at least two pivoting members comprise at least one lifting tine.

3. A method for lifting an object using a robotic vehicle having a main chassis and at least one stair climbing arm adapted to pivot about a transverse axis generally perpendicular to a side of the main chassis, wherein the stair climbing arm articulates between positions to lift the front end of the vehicle to assist the robotic vehicle in climbing stairs and positions to traverse the front end of the vehicle over obstacles while moving about in a variety of environments, the method comprising:
    providing a lifting apparatus for the robotic vehicle, the lifting apparatus comprising:
        at least one pivoting member pivotably coupled to the main chassis;
        at least one lifting tine disposed on the at least one pivoting member; and
        at least one linkage arm pivotably connecting the pivoting member to the at least one stair climbing arm;
    pivoting the stair climbing arm about the transverse axis in a first direction to pivot the pivoting member such that a distal portion of the at least one lifting tine extends below a lower portion of the object;
    moving the robotic vehicle toward the object so as to position the at least one lifting tine beneath the object; and
    pivoting the stair climbing arm about the transverse axis in an opposite direction to the first direction to pivot the pivoting member, connected by the at least one linkage arm, such that the at least one lifting tine lifts the object.

4. The method of claim 3, further comprising providing a robotic manipulator arm coupled to the main chassis.

5. The method of claim 4, further comprising positioning the robotic manipulator arm against a surface of the object to assist the lifting apparatus in lifting and supporting the object.

6. The robotic vehicle of claim 1, further comprising a manipulator arm pivotably coupled to the main chassis and having a plurality of connected sections.

7. The robotic vehicle of claim 6, wherein the manipulator arm comprises a camera mounted thereon.

8. The robotic vehicle of claim 6, wherein the manipulator arm comprises an appendage connected thereto.

9. The robotic vehicle of claim 8, wherein the appendage comprises at least one of a hook, a knife, a gripping mechanism, a probe, and a sensor.

10. The robotic vehicle of claim 6, wherein the manipulator arm is adapted to extend beyond a distal end of the main chassis.

11. The robotic vehicle of claim 1, wherein the main chassis comprises a pair of parallel main tracks, each including a flexible continuous belt, coupled to a corresponding side of the main frame.

12. The robotic vehicle of claim 1, further comprising a digging attachment pivotably coupled to the at least two pivoting members and adapted to pivot in response to a pivoted articulation of the at least one stair climbing arm.

13. The robotic vehicle of claim 1, wherein the stair climbing arm tapers from the proximal end to the distal end, and wherein a forward track is trained about the stair climbing arm.

14. The robotic vehicle of claim 1, wherein the stair climbing arm has a length sufficiently long to allow the distal end to extend below the main chassis in one or more degrees of rotation of the stair climbing arm.

15. The robotic vehicle of claim 1, wherein each pivoting member has a pivoting member length configured relative to a length between the transverse axis and a point where the linkage arm is pivotably connected to the stair climbing arm so that, when the stair climbing arm provides motion to the pivoting members, a torque produced by the pivoting members is greater than a torque produced by the stair climbing arm.

16. The robotic vehicle of claim 15, wherein the ratio between the torque produced by the pivoting members and the torque produced by the stair climbing arm is 2.25:1.

17. The robotic vehicle of claim 15, wherein the ratio between the torque produced by the pivoting members and the torque produced by the stair climbing arm is greater than 2.5:1.

18. The robotic vehicle of claim 16, wherein the pivoting member length is 9 inches and the length between the transverse axis and the point where the linkage arm is pivotably connected to the stair climbing arm is 4 inches.

19. The method of claim 3, wherein a weight of the object exceeds a weight of the vehicle.

20. The method of claim 19, wherein, after moving the vehicle toward the object, a center of gravity of the vehicle is located a first distance away from a closest point where the main chassis is in contact with the ground next to the object, and wherein the first distance is at least twice a second distance from the closest point where the main chassis is in contact with the ground next to the object to a center of gravity of the object.

21. The method of claim 20, wherein the weight of the object is approximately twice the weight of the vehicle.

22. The method of claim 21, wherein the object is an artillery shell weighing approximately 70 to 100 lb.

23. The method of claim 22, wherein the artillery shell weighs 96 lb and the robotic vehicle weighs 48 lb.

24. A robotic vehicle comprising:
a main chassis having left and right sides, a front end, and a differential drive system for maneuvering the robotic vehicle over a surface;
a forward section comprising at least one stair climbing arm having a proximal end and a distal end, the proximal end of the stair climbing arm being pivotally coupled to the main chassis near the front end of the main chassis about a transverse axis defined generally perpendicular to the sides of the main chassis; and
a lifting apparatus comprising:
 a left pivoting member pivotally coupled to the left side of the main chassis and a right pivoting member pivotably coupled to the right side of the main chassis; and
 a support arm connecting the left and right pivoting members by extending in a direction from one side of the main chassis to the other side of the main chassis, wherein the support arm includes a plurality of mounting holes and a plurality of attachments attached to the support arm by the mounting holes.

25. The robotic vehicle of claim 24, wherein the attachments are lifting tines.

26. The robotic vehicle of claim 24, wherein the attachments are releasably attached to the support arm by pin connectors that connect to the mounting holes.

27. The robotic vehicle of claim 24, wherein the mounting holes are placed at one inch intervals along the length of the support arm.

28. The robotic vehicle of claim 24, wherein the mounting holes are placed at 45 degree intervals around the support arm.

29. A robotic vehicle comprising:
a main chassis having two sides, a front end, and a differential drive system for maneuvering the robotic vehicle over a surface;
a forward section comprising at least one stair climbing arm having a proximal end and a distal end, the proximal end of the stair climbing arm being pivotally coupled to the main chassis near the front end of the main chassis about a transverse axis defined generally perpendicular to the sides of the main chassis; and
a lifting apparatus comprising:
 at least two pivoting members pivotably coupled to the main chassis; and
 a support arm connecting the two pivoting members, wherein the support arm includes a plurality of mounting holes and a plurality of attachments attached to the support arm by the mounting holes;
wherein the attachments are lifting tines.

30. A robotic vehicle comprising:
a main chassis having two sides, a front end, and a differential drive system for maneuvering the robotic vehicle over a surface;
a forward section comprising at least one stair climbing arm having a proximal end and a distal end, the proximal end of the stair climbing arm being pivotally coupled to the main chassis near the front end of the main chassis about a transverse axis defined generally perpendicular to the sides of the main chassis; and
a lifting apparatus comprising:
 at least two pivoting members pivotably coupled to the main chassis; and
 a support arm connecting the two pivoting members, wherein the support arm includes a plurality of mounting holes and a plurality of attachments attached to the support arm by the mounting holes;
wherein the attachments are releasably attached to the support arm by pin connectors that connect to the mounting holes.

* * * * *